US008798879B2

(12) United States Patent
Seel

(10) Patent No.: US 8,798,879 B2
(45) Date of Patent: Aug. 5, 2014

(54) METHOD AND DEVICE FOR OPERATING A DRIVE UNIT OF A MOTOR VEHICLE

(75) Inventor: Andreas Seel, Bonn (DE)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 13/224,700

(22) Filed: Sep. 2, 2011

(65) Prior Publication Data

US 2012/0059567 A1 Mar. 8, 2012

(30) Foreign Application Priority Data

Sep. 6, 2010 (DE) ........................ 10 2010 040 279

(51) Int. Cl.
*G06F 7/00* (2006.01)
*G06F 17/00* (2006.01)
*G06F 19/00* (2011.01)

(52) U.S. Cl.
USPC ................................ 701/54; 701/84; 701/110

(58) Field of Classification Search
USPC ....................... 701/101, 102, 110, 54, 84, 93; 123/339.1, 339.14, 339.16, 339.18
See application file for complete search history.

(56) References Cited

U.S. PATENT DOCUMENTS

| | | | | |
|---|---|---|---|---|
| 6,119,063 | A * | 9/2000 | Hieb et al. | 701/110 |
| 6,877,480 | B2 * | 4/2005 | Persson et al. | 123/339.14 |
| 7,051,517 | B2 * | 5/2006 | Mehta et al. | 60/285 |
| 7,254,472 | B2 * | 8/2007 | Larsen et al. | 701/54 |
| 7,991,534 | B2 * | 8/2011 | Seel et al. | 701/102 |
| 8,135,517 | B2 * | 3/2012 | Lupo et al. | 701/48 |
| 2009/0070018 | A1 * | 3/2009 | Ludwig et al. | 701/112 |

FOREIGN PATENT DOCUMENTS

| | | |
|---|---|---|
| DE | 199 05 604 | 8/2000 |
| DE | 100 47 602 | 4/2002 |
| DE | 101 19 724 | 2/2003 |
| DE | 101 38 493 | 2/2003 |
| DE | 102 53 004 | 5/2004 |
| DE | 10 2007 013 253 | 9/2008 |

* cited by examiner

*Primary Examiner* — Thomas Moulis
*Assistant Examiner* — Joseph Dallo
(74) *Attorney, Agent, or Firm* — Kenyon & Kenyon LLP

(57) ABSTRACT

A method is described for operating a drive unit of a motor vehicle, a setpoint torque being determined for driving the drive unit as a function of a driver request torque and an idle speed regulator torque being included in the driver request torque for determining the setpoint torque, and a drivability filter being applied for torque smoothing. In order to maintain the quality of the speed regulation and simultaneously make the drivability of the vehicle comfortable, the drivability filter is applied before or after the inclusion of the idle speed regulator torque in the driver request torque as a function of the instantaneous driving situation of the motor vehicle.

10 Claims, 3 Drawing Sheets

METHOD AND DEVICE FOR OPERATING A DRIVE UNIT OF A MOTOR VEHICLE

RELATED APPLICATION INFORMATION

The present application claims priority to and the benefit of German patent application no. 10 2010 040 279.6, which was filed in Germany on Sep. 6, 2010, the disclosure of which is incorporated herein by reference.

FIELD OF THE INVENTION

The present invention relates to a method for operating a drive unit of a motor vehicle, a setpoint torque being determined for driving the drive unit as a function of a driver request torque and an idle speed regulator torque being included in the driver request torque for determining the setpoint torque and a drivability filter being applied for torque smoothing, as well as a device for implementing the method.

BACKGROUND INFORMATION

In the case of motor vehicles having an internal combustion engine, a so-called idle speed regulation is used. This idle speed regulation has the task of keeping the internal combustion engine at a so-called idle speed when a torque request from the driver is absent or too low, i.e., the accelerator pedal is not depressed. This idle speed regulation is performed by an idle speed regulator which is situated in a control unit of the vehicle engine. Furthermore, the control unit contains a drivability filter. This filter has a function of influencing the torque and filters the driver request for the purpose of avoiding Bonanza effects on the vehicle's drive shaft, in particular the delivery of a zero torque by the clutch.

During idling, the functions of the idle speed regulator and of the drivability filter result in a contradiction, since the idle speed regulator wants to build up the idle speed regulator torque rapidly. If this is done, Bonanza effects occur on the drive shaft of the vehicle, which results in reduction of driving comfort.

In order to achieve optimal filtering and determination of the zero torque level of the clutch, it would be optimal to add the entire idle speed regulator torque to the torque path upstream from the drivability filter. This has, however, the disadvantage of impairing the idle speed regulation, since the drivability filter causes a phase shift in the control loop.

A method and a device for operating a drive unit are known from DE 10 2007 013 253 A1. A first portion of the second setpoint value for the output variable predefined by a speed regulator represents a stationary portion of the second setpoint value for the output variable predefined by the speed regulator. Based on the consideration of the stationary portion in forming the first setpoint value, the stationary portion is also considered in the case of filtering the damping of the Bonanza effect. The function of damping the Bonanza effect in the case of an activated speed regulator may thus be performed more precisely. However, this method does not contribute to preventing the conflict described above in the case of dynamic idle speed regulator interventions.

SUMMARY OF THE INVENTION

The method according to the present invention for operating a drive unit of a motor vehicle having the features of claim 1 has the advantage that the quality of the speed regulation is preserved and the drivability of the vehicle is simultaneously made comfortable. Applying the drivability filter before or after the idle speed regulator torque is included in the driver request torque as a function of the instantaneous driving situation of the motor vehicle ensures that either the drivability filter or the idle speed regulator are given greater consideration in operating the drive unit. In this connection, the drivability filter fulfills the task of forming the torque or smoothing its curve in such a way that the vehicle is accelerated without jerking when a switchover is made from idle speed regulation to regulation controlled by the driver which results from the driver's operation of the accelerator pedal. The idle speed regulator fulfills the task of maintaining the idle speed by outputting a suitable torque. The alternating greater consideration of the idle speed regulator or drivability filter results in an improvement of the motor vehicle's driving behavior, in particular in the case of dynamic idle speed regulator interventions. It is possible in this case to check the driving situation using sensors contained per se in the motor vehicle and output it to the control unit, which performs the alternating application of the drivability filter before or after the idle speed regulator torque is included in the driver request torque.

Advantageously, the idle speed regulator torque is included in different driving torques which occur in a torque path containing the drivability filter. Depending on where the idle speed regulator torque is included in the torque path, in particular added, the output signal of the idle speed regulator or of the drivability filter is given greater or lesser consideration. This makes it possible to make the idle speed regulation including its intervention particularly dynamic.

In one refinement, the driver request torque is used as a driving torque, the idle speed regulator torque being included in the driver request torque, an included torque being sent to the drivability filter which outputs the setpoint torque for driving the drive unit. In this embodiment, greater consideration is given to the drivability filter and optimal drivability is always ensured in relation to the idle speed regulation.

In one refinement, the driver request torque which is smoothed by the drivability filter is used as a driving torque, the idle speed regulator torque being included in the driver request torque which is output and smoothed by the drivability filter, the calculated torque representing the setpoint torque for driving the drive unit. In this case, the idle speed regulator torque is only included in after the drivability filter, in particular added, resulting in greater consideration of the idle speed regulation. Bonanza effects, which occur in particular when the idle speed regulator is replaced by the driver using the accelerator, are accepted.

Advantageously, the drivability filter is applied as a function of the instantaneous driver request. If, when operating the accelerator pedal, the driver requests a high torque which exceeds the torque output by the idle speed regulator, in this case the drivability filter is given greater consideration and the inclusion of the idle speed regulator torque takes place before the drivability filter. If the driver does not operate the accelerator pedal, greater consideration is given to the idle speed regulation in that the inclusion takes place after the drivability filter.

Alternatively, the drivability filter is applied as a function of the instantaneous speed of the drive unit. If the speed of the drive unit is higher than the idle speed, greater consideration is given to the drivability filter in that the inclusion of the idle speed regulator torque takes place before the drivability filter. If the speed of the drive unit is lower than the idle speed, greater consideration is again given to the idle speed regulator in that the inclusion takes place after the drivability filter.

Furthermore, the drivability filter is applied as a function of the instantaneous idle speed regulator torque. In this connection, it is checked if the idle speed regulator outputs a minimum torque. If this is the case, greater consideration is given to the idle speed regulator.

One refinement of the exemplary embodiments and/or exemplary methods of the present invention relates to a device for operating a drive unit of a motor vehicle, a setpoint torque being determined for driving the drive unit as a function of a driver request torque and an idle speed regulator torque being included in the driver request torque for determining the setpoint torque and a drivability filter being applied for torque smoothing. In order to maintain the quality of the idle speed regulation when idling and simultaneously prevent a loss of driving comfort, an arrangement provides for applying the drivability filter before or after the inclusion of the idle speed regulator torque into the driver request torque as a function of the instantaneous driving situation. This ensures that the contradictory requirements between the drivability filter, which seeks to form the torque in such a way that the vehicle is accelerated without jerking, and the idle speed regulator, which must maintain the idle speed, are resolved while outputting a suitable torque. This process makes it possible for either the idle speed regulator or the drivability filter to be given greater consideration depending on the driving situation of the motor vehicle.

Advantageously, an inclusion point for including the idle speed regulator torque in the torque path containing the drivability filter is positioned upstream from the drivability filter. In this connection, the adherence to an optimal damping of the Bonanza effect is given greater consideration than the idle speed regulator torque predefined by the idle speed regulator.

Alternatively, an inclusion point for including the idle speed regulator torque in the torque path containing the drivability filter is positioned downstream from the drivability filter. The idle speed regulator torque predefined by the idle speed regulator is thus given greater consideration and an optimal idle speed regulation is performed.

In one refinement, a first inclusion point is situated upstream from the drivability filter and a second inclusion point is situated downstream from the drivability filter, at which the idle speed regulator torque predefined by the idle speed regulator may be included. A switching element is also provided. Switching over the switching element makes it possible to activate very rapidly the inclusion points at which the idle speed regulator torque predefined by the idle speed regulator is included upstream or downstream from the drivability filter. The consequence of this is that a high dynamic is ensured in the case of idle speed regulator interventions.

The present invention allows for numerous exemplary embodiments. One of them will be elucidated in greater detail with reference to the figures in the drawings.

DETAILED DESCRIPTION

Identical features are denoted by identical reference numbers.

Figure 1:
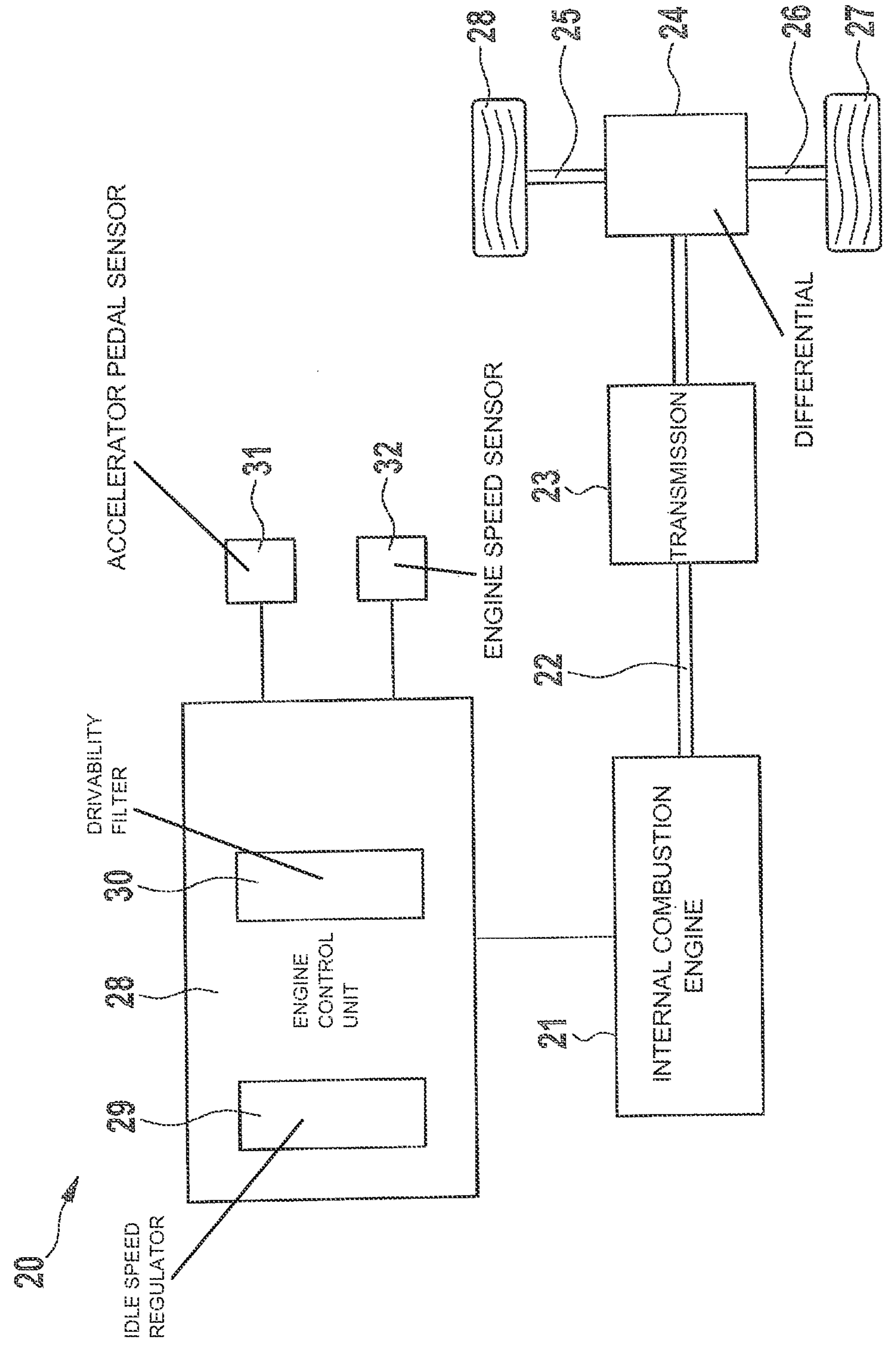
FIG. 1 shows a schematic diagram of a drive unit of a motor vehicle.

A schematic diagram of a drive unit 20 of a motor vehicle is represented in FIG. 1. Drive unit 20 includes an internal combustion engine 21 which is connected to a transmission 23 via a drive shaft 22. Transmission 23 leads to a differential 24 which is situated on a vehicle axle 25. Two drive wheels 26 and 27 are positioned on vehicle axle 25. Internal combustion engine 21 is activated by an engine control unit 28. Engine control unit 28 includes, for example, an idle speed regulator 29 and a drivability filter 30. Numerous sensors lead to engine control unit 28, of which only an accelerator pedal sensor 31 and an engine speed sensor 32 are represented.

Idle speed regulator 29 represents the regulation of a speed of drive unit 20 in the idling state, i.e., in the state in which no driver request is present and the driver does not operate the accelerator pedal. Drivability filter 30 filters the driver request when the driver operates the accelerator pedal, the operation of the accelerator pedal being indicated to engine control unit 29 via accelerator pedal sensor 31. The filtering of the driver request is necessary in order to reduce Bonanza effects that occur when the idle speed regulation of the motor vehicle is shifted to the driver request-dependent speed of internal combustion engine 21. These Bonanza effects occur in particular when the clutch engages. To avoid the disadvantage of a fixed setting of the idle speed regulation or of drivability filter 30 in relation to one another and, specific to the situation, to consider the one or the other component to a greater extent, two possibilities exist for including the idle speed regulator torque in a torque path 1.

Figure 2:
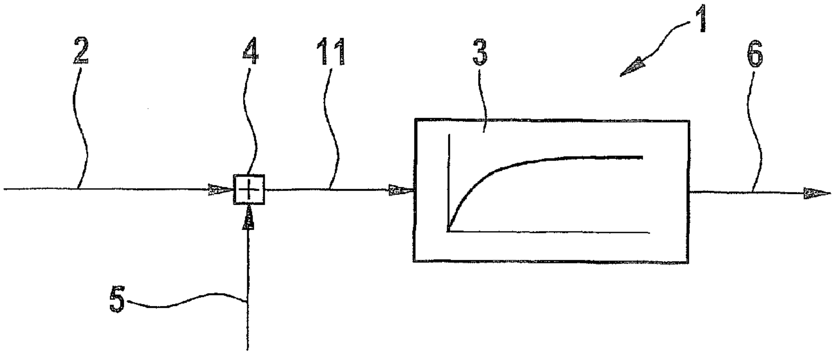
FIG. 2 shows a first variant for including the idle speed regulator torque in a torque path.

A first variant for including the idle speed regulator torque in torque path 1 is represented in FIG. 2. A driver request torque 2 is sent to an inclusion point 4, at which idle speed regulator torque 5 is also present. Driver request torque 2 and idle speed regulator torque 5 are included, in particular added, at inclusion point 4 and torque 11 calculated in this way is sent to drivability filter 3. Drivability filter 3 filters the result, in particular the sum, of driver request torque 2 and idle speed regulator torque 5 and as a result outputs a setpoint torque 6 which is used for activating internal combustion engine 21. In the case of this variant, preference is always given to an optimal drivability compared to the generally worsening idle speed regulation.

Figure 3:
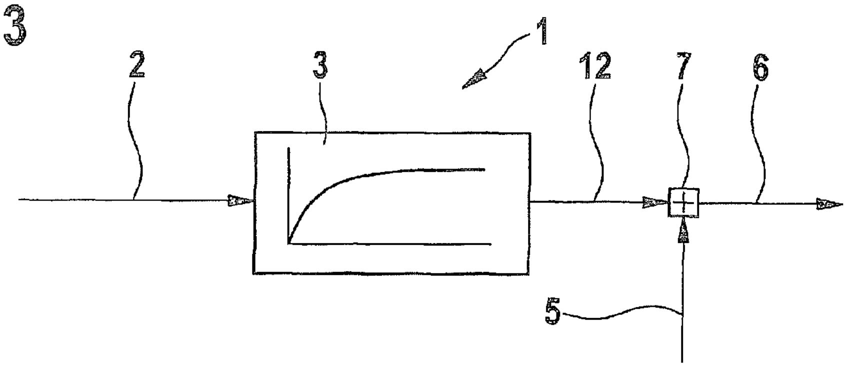
FIG. 3 shows a second variant for including the idle speed regular torque in a torque path.

In contrast to FIG. 2, a torque path 1 is shown in FIG. 3 in which driver request torque 2 is sent directly to drivability filter 3. Drivability filter 3 smoothes driver request torque 2 and outputs a smoothed driver request torque 12. Downstream from drivability filter 3, a second inclusion point 7 is situated, at which smoothed driver request torque 12 is combined with idle speed regulator torque 5, in particular added. Both of them make up setpoint torque 6 which is used in engine control unit 28 for driving internal combustion engine 21. If, as in FIG. 3, idle speed regulator 29 is included, in particular added, in driver request torque 2 only after drivability filter 3, this improves the regulation of idle-speed regulator 29. However, Bonanza effects may occur, in particular when idle speed regulator 29 is replaced by the driver request-controlled speed regulation.

As shown, idle speed regulator 29 or drivability filter 3 is given greater or lesser consideration when idle speed regulator torque 5 is included after or before drivability filter 3. If compliance with an optimal damping of Bonanza effects has priority, the idle speed regulator torque is included before drivability filter 3. If optimal idle speed regulation has priority, the idle speed regulator torque is included after drivability filter 3.

Figure 4:
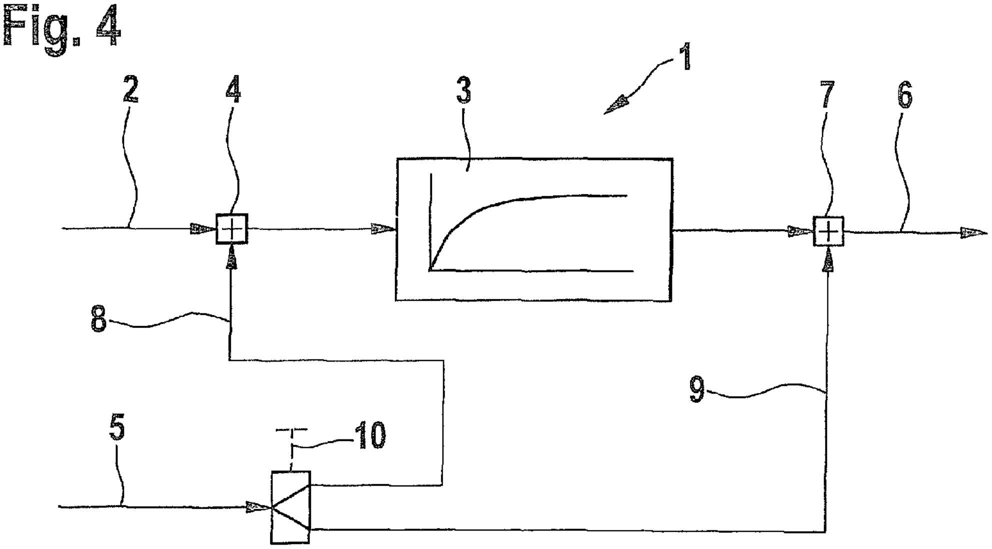
FIG. 4 shows the torque path according to FIGS. 2 and 3 having a switching element.

In one advantageous embodiment, torque path 1, as represented in FIG. 4, has two inclusion points 4, 7. Driver request torque 2 is sent via inclusion point 4 to drivability filter 3 which may be designed as a low pass filter. Downstream from drivability filter 3, second inclusion point 7 is situated, from which setpoint torque 6 is derived. A switching element 10 is present for deciding at which inclusion point 4, 7 idle speed regulator torque 5 should intervene. This switching element 10 is connected to first inclusion point 4 via connection 8 and to second inclusion point 7 via connection 9. Depending on the instantaneous situation of the vehicle, switching element 10 switches idle speed regulator torque 5 to either first inclusion point 4 or to second inclusion point 7.

When driver request torque 2 is included, in particular added, in idle speed regulator torque 5 at first inclusion point 4, the ascertained torque, in particular the sum torque, from driver request torque 2 and idle speed regulator torque 5, calculated torque 11, is smoothed by drivability filter 3. If in contrast, idle speed regulator torque 5 is added, in particular added to form a sum, to smoothed driver request torque 12 at inclusion point 7 only after drivability filter 3, a faster torque build-up is prioritized and a smoothing of the signal is largely dispensed with.

It is decisive to recognize which component is more important in the instantaneous driving situation. If the vehicle is, for example, idling at the moment and the driver does not depress the accelerator pedal, it is most important to maintain the idle speed exactly, even if this should cause a Bonanza effect. If, however, the engine speed, for example, significantly exceeds the setpoint idle speed, it is more important to not cause a Bonanza effect. In this case, the idle speed regulation is seen as less important.

Another significant condition is when the driver takes over for idle speed regulator 29. If it is recognized that the driver has accelerated strongly, drivability filter 3 is given greater consideration than idle speed regulator 29, since the risk of an idle speed undershoot is not present.

Figure 5:
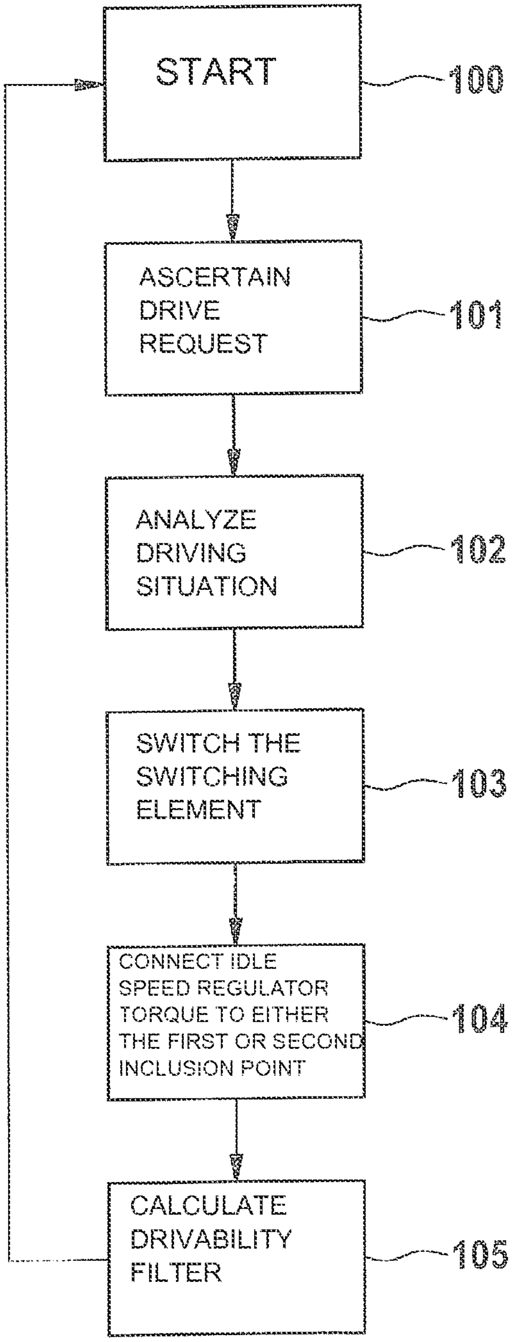
FIG. 5 shows a schematic flow chart for an exemplary embodiment of the method according to the present invention.

A possible method for the differentiated application of drivability filter 3 will be explained with reference to FIG. 5. The method starts in block 100. Subsequently, engine control unit 28 ascertains in block 101 with the aid of accelerator pedal sensor 31 if a driver request is present and the magnitude of driver request torque 2. Simultaneously, idle speed regulator torque 5 generated by idle speed regulator 29 is ascertained.

The driving situation is analyzed in following block 102. For this purpose, it is evaluated, for example, if the driver request is present and/or if idle speed regulator 29 stays at the limit stop of the minimum torque. Furthermore, the speed of internal combustion engine 21 may be compared with the setpoint idle speed. Starting from these situation-dependent components, switching element 10 is switched in block 103.

Depending on the result obtained by engine control unit 28 in its analysis in block 102, the idle speed regulator torque is connected either to first inclusion point 4 or to second inclusion point 7 in block 104 as a function of the switch position of switching element 10. After that, the calculation of drivability filter 3 takes place in block 105. In conclusion, setpoint torque 6 for internal combustion engine 21 is calculated. This method follows a time loop, so that after the setpoint torque is calculated in block 105, the method is returned to block 100 where it is restarted and evaluated.

The variable application of drivability filter 3 with respect to idle speed regulator torque 5 makes it possible to give greater or lesser consideration to the idle speed regulation and drivability filter 3 depending on the driving situation of the motor vehicle.

What is claimed is:

1. A method for operating a drive unit of a motor vehicle, the method comprising:

determining a setpoint torque for driving the drive unit as a function of a driver request torque and an idle speed regulator torque being included in the driver request torque for determining the setpoint torque;

determining between applying a drivability filter, for torque smoothing, before the inclusion of the idle speed regulator torque in the driver request torque and applying the drivability filter after the inclusion of the idle speed regulator torque in the driver request torque, wherein the determination is a function of an instantaneous driving situation of the motor vehicle; and applying the drivability filter according to the determination.

2. The method of claim 1, wherein the driver request torque is used as a driving torque, wherein the idle speed regulator torque is included in the driver request torque, and wherein a calculated torque is sent to the drivability filter, which outputs the setpoint torque for driving the drive unit.

3. The method of claim 1, wherein the driver request torque, which is smoothed by the drivability filter, is used as a driving torque, wherein the idle speed regulator torque is included in the driver request torque, which is output and smoothed by the drivability filter, and wherein the calculated torque represents the setpoint torque for driving the drive unit.

4. The method of claim 1, wherein the drivability filter is applied before or after the inclusion of the idle speed regulator torque as a function of the instantaneous driver request.

5. The method of claim 1, wherein the drivability filter is applied before or after the inclusion of the idle speed regulator torque as a function of the instantaneous speed of the drive unit.

6. The method of claim 1, wherein the drivability filter is applied before or after the inclusion of idle speed regulator torque as a function of the instantaneous idle speed regulator torque.

7. A device for operating a drive unit of a motor vehicle, comprising:

a setpoint torque determining arrangement to determine setpoint torque for driving the drive unit as a function of a driver request torque and an idle speed regulator torque being included in the driver request torque for determining the setpoint torque; and a drivability filter arrangement for applying a drivability filter for torque smoothing, wherein the drivability filter arrangement determines between using the drivability filter before or after the inclusion of the idle speed regulator torque in the driver request torque as a function of the instantaneous driving situation of the motor vehicle and applies the drivability filter according to the determination.

8. The device of claim 7, wherein an inclusion point for including the idle speed regulator torque in a torque path containing the drivability filter is positioned upstream from the drivability filter.

9. The device as recited in claim 8, wherein the inclusion point for including the idle speed regulator torque in the torque path containing the drivability filter is positioned downstream from the drivability filter.

10. The device as recited in claim 8, wherein a first inclusion point is situated upstream from the drivability filter and a second inclusion point is situated downstream from the drivability filter, both inclusion points being connected to a switching element, the inclusion points at which the idle speed torque predefined by the idle speed regulator is included being activatable by switching over the switching element.

* * * * *